Patented Dec. 24, 1940

2,225,756

UNITED STATES PATENT OFFICE 2,225,756

METHOD FOR MAKING IRRADIATED PHENOLPHTHALEIN

Ludwig Pincussen, Oak Park, Ill., assignor to The Board of Trustees of the University of Illinois, Urbana, Ill.

No Drawing. Application January 24, 1938, Serial No. 186,653

4 Claims. (Cl. 204—158)

The object of my invention is to provide a substance which may be administered to human beings and animals for laxative purposes in doses of much smaller quantity than has heretofore been necessary in the use of preparations containing white phenolphthalein. This is accomplished by irradiating white phenolphthalein in a suitable solution or in the form of a salt to produce a substance which I term irradiated phenolphthalein which seems to have substantially the same characteristics as white phenolphthalein, except as to color and laxative properties; being light yellow or yellow brown in color and having a laxative effect about two or three times as strong as the white phenolphthalein.

A suitable quantity of white phenolphthalein in solution or in the form of a salt is placed in a container under cover and irradiated for a suitable length of time, after which the phenolphthalein is recovered by evaporation or precipitation. The container may be in the form of a dish with a flat bottom, covered with a quartz plate. A quartz-mercury-vapor lamp, a carbon arc lamp, sunlight, or other suitable source of light may be employed; ultra-violet rays are wanted but not needed if certain catalyzers be added to the solution.

The period of irradiation and the intensity of the light employed vary with the degree and rapidity of change desired and the conditions of treatment. According to the laws of optics, the time of irradiation varies with the distance of the light source from the solution. For example, the same effect is produced whether the irradiation at a distance of 10 inches lasts 2 hours or at a distance of 1¼ inches, 2 minutes only. Thus an apparatus with continuous flow may be used provided that the running solution be subjected to irradiation for the requisite period of time.

The effect of the light source on the solution of phenolphthalein or phenolphthalein salts may be increased by adding to the solution oxidizing substances, e. g. bromine, potassium chlorate or catalyzers such as metal salts, e. g. iron sulphate, uranium acetate, and sensibilizing dye stuffs, e. g. eosin, erythrosin, quinine-derivatives, hematoporphyrin. After irradiation, the metals may be removed by adding acid for precipitating the transformed compound, as in acid solution the metal salts are soluble and in this way are separated from the compound which is nearly insoluble in water.

I have obtained good products by the following procedure:

1. I dissolved 10 grams of white phenolphthalein in 100 cc. acetone in a flat bottom dish, the solution forming a layer approximately five millimeters deep. This dish was covered with a quartz plate, exposed for about two hours under a quartz-mercury-vapor lamp of about 3000 candle power 10 inches distant from the surface of the solution. At first colorless, the solution becomes yellowish increasingly as irradiation continues. After irradiation, the solution was evaporated on a water bath leaving a yellow residue. This was administered to monkeys, which are fairly comparable to humans, and to lower animals with the results indicated.

2. I dissolved 10 grams of white phenolphthalein in 200 cc. aqueous solution of sodium hydroxide containing 1.5 grams NaOH, i. e. small excess over the amount needed, forming a pink phenolphthalein-sodium salt in a layer 10 mm. deep in a similar container. This was exposed to the rays of a quartz-mercury-vapor lamp for two hours. The solution was then cooled and the free transformed phenolphthalein precipitated from the solution by slowly adding hydrochloric acid until a slightly acid action (pH=6.0) was secured. The precipitate was removed by filtering and washing with cold distilled water until the wash water ceased to show an acid reaction. The resultant yellow powder was similarly administered with like results.

When a catalyst or an oxidizing substance is used, it should be added to the solution prior to irradiation.

Having thus disclosed the invention, I claim:

1. A method of making irradiated phenolphthalein consisting in dissolving white phenolphthalein in an aqueous solution of sodium hydroxide, exposing the solution to a strong artificial light containing ultra-violet rays, at a distance depending on the time of exposure and the intensity of the light, being of the order of 3000 candle power at 10 inches for two hours, adding acid to the solution to precipitate the irradiated phenolphthalein, washing and then drying the precipitate.

2. A method of making irradiated phenolphthalein consisting in dissolving white phenolphthalein in an alkaline solution, adding a small quantity of a member of the group consisting of eosin, erythrosin, and hematoporphyrin, exposing the solution to a strong artificial light containing ultra-violet rays, as set forth in claim 1, adding acid to the solution to precipitate the irradiated phenolphthalein, washing and then drying the precipitate.

3. A method of making irradiated phenolphthalein consisting in dissolving white phenolphthalein in an alkaline solution, adding potassium chlorate, exposing the solution to a strong artificial light containing ultra-violet rays, as set forth in claim 1, adding acid to the solution to precipitate the irradiated phenolphthalein, washing and then drying the precipitate.

4. A method of making irradiated phenolphthalein consisting in dissolving white phenolphthalein in an alkaline solution, adding iron sulphate, exposing the solution to a strong artificial light containing ultra-violet rays, as set forth in claim 1, adding acid to the solution to precipitate the irradiated phenolphthalein, washing and then drying the precipitate.

LUDWIG PINCUSSEN.